Jan. 16, 1945.   J. L. SHROYER ET AL   2,367,626
COOKING DEVICE
Filed Aug. 21, 1941   3 Sheets-Sheet 1

Inventors:
Jacob L. Shroyer,
Harold A. Michaelis,
by Harry E. Dunham
Their Attorney.

Jan. 16, 1945. J. L. SHROYER ET AL 2,367,626
COOKING DEVICE
Filed Aug. 21, 1941   3 Sheets-Sheet 2
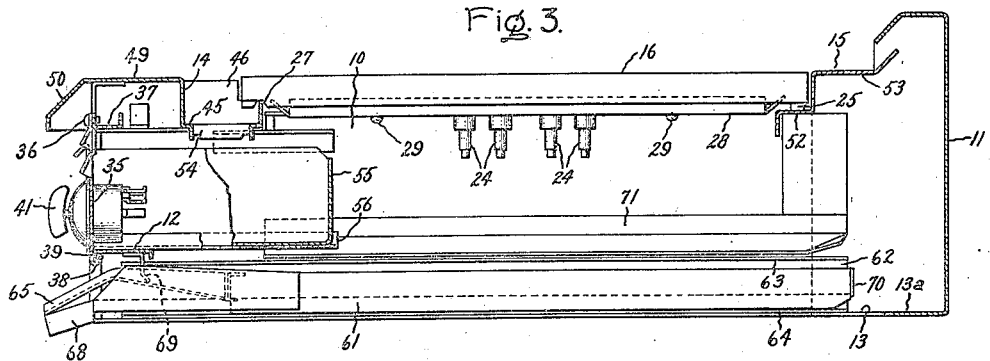
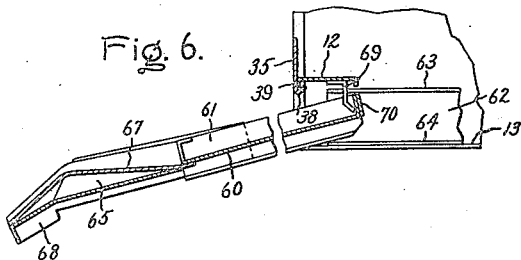
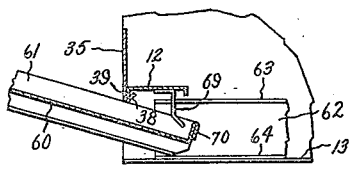
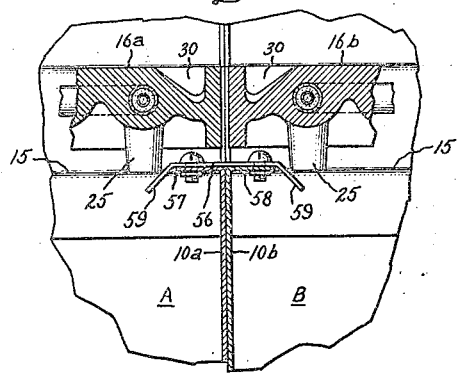
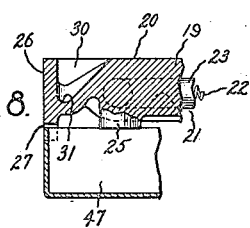
Inventors:
Jacob L. Shroyer,
Harold A. Michaelis,
by Harry E. Dunham
Their Attorney.

Jan. 16, 1945.   J. L. SHROYER ET AL   2,367,626
COOKING DEVICE
Filed Aug. 21, 1941   3 Sheets-Sheet 3

Inventors:
Jacob L. Shroyer,
Harold A. Michaelis,
by Harry E. Dunham
Their Attorney.

Patented Jan. 16, 1945

2,367,626

UNITED STATES PATENT OFFICE 2,367,626

COOKING DEVICE

Jacob L. Shroyer, Oak Park, and Harold A. Michaelis, Elmhurst, Ill., assignors to Edison General Electric Appliance Company, Inc., Chicago, Ill., a corporation of New York Application August 21, 1941, Serial No. 407,762

1 Claim. (Cl. 99—425)

Our invention relates to cooking devices and more particularly to cooking devices of the type in which a plurality of heated cooking units are supported on the top portion thereof to form a cooking surface.

An object of our invention is to provide a cooking device of the above type having an improved frame structure which permits extending of the cooking surface across the entire width of the device whereby the area available for cooking is increased and whereby a number of cooking devices may be banked in side-by-side relation to form an enlarged continuous cooking surface.

Further objects and advantages of our invention will become apparent as the following description proceeds and the features of novelty which characterize our invention will be pointed out with particularity in the claims annexed to and forming part of this specification.

Figure 1:
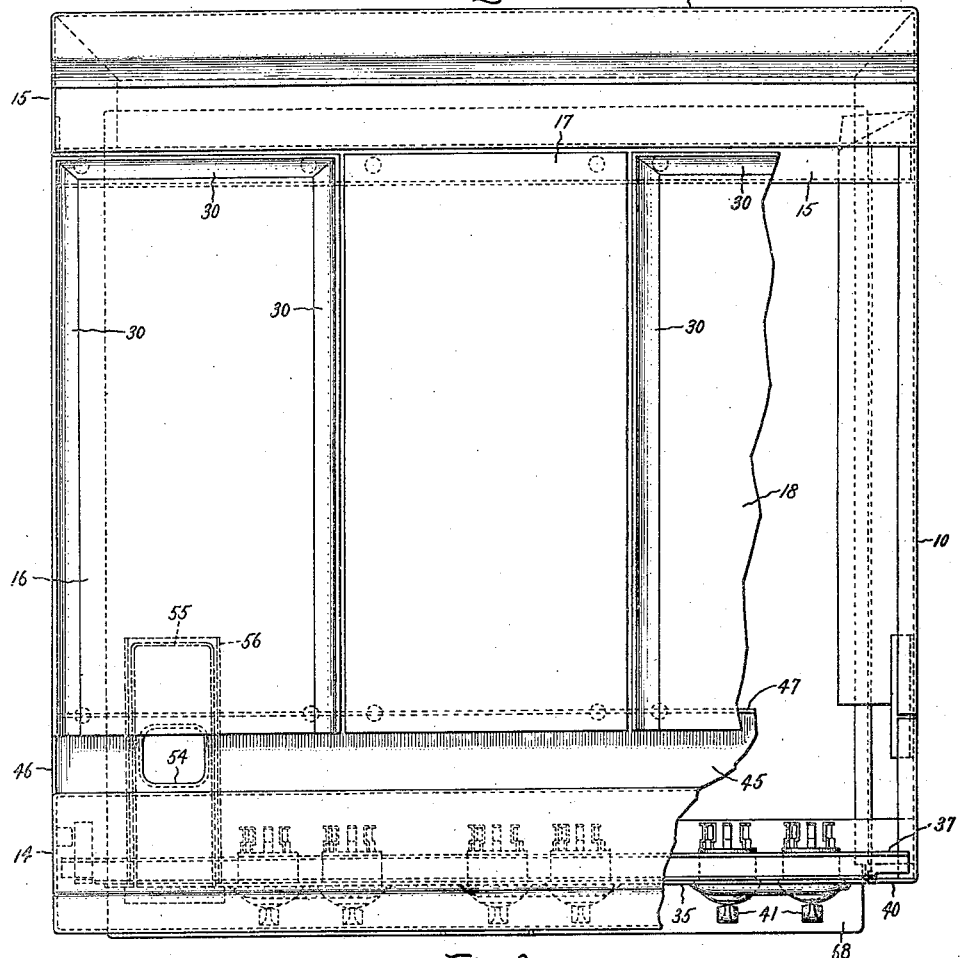
Figure 2:
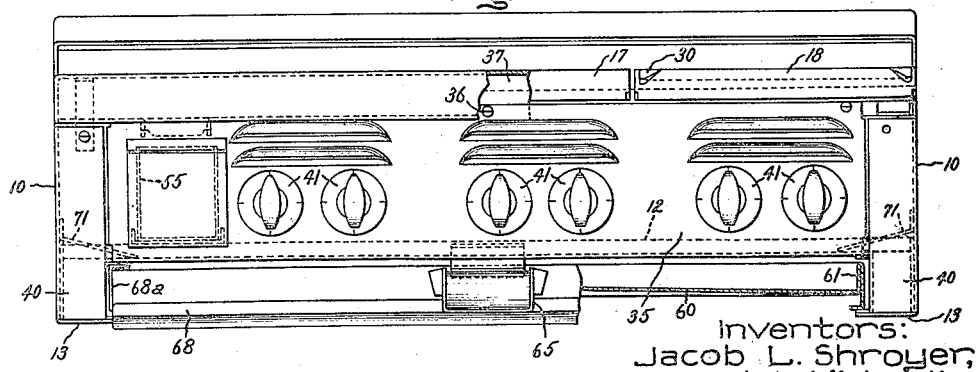
Figure 4:
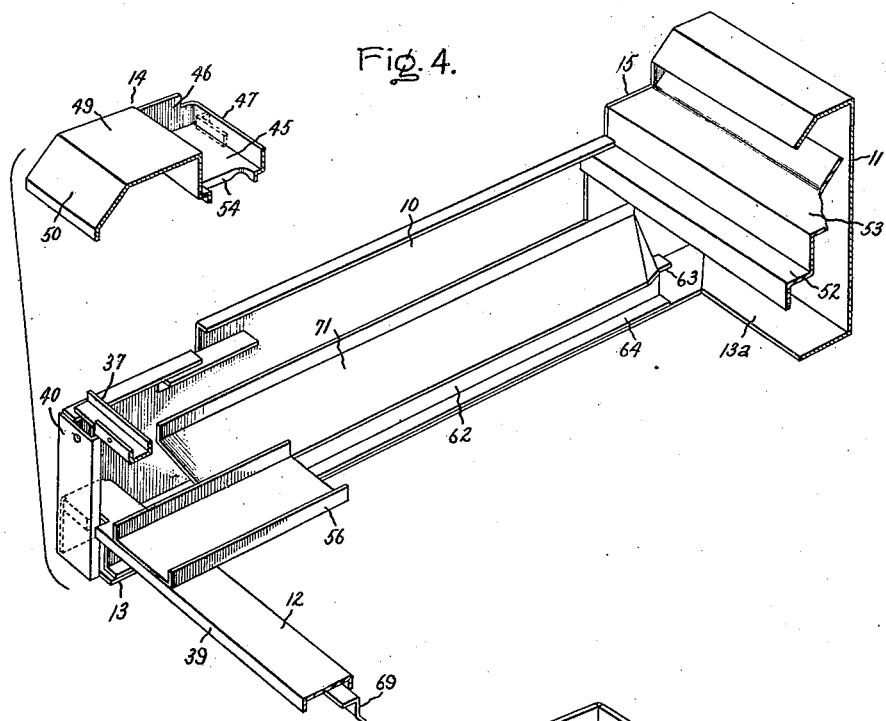
Figure 5:
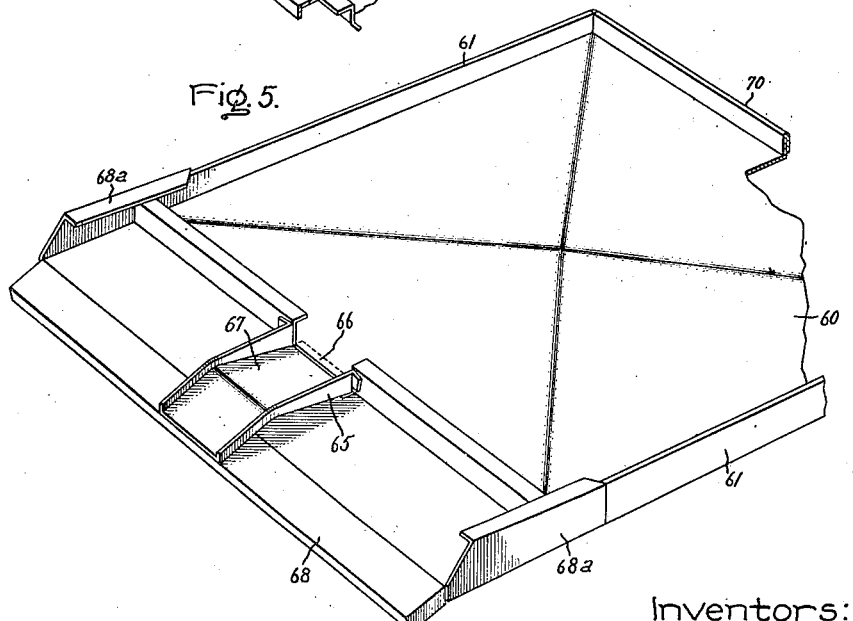

For a more complete understanding of this invention reference should be had to the accompanying drawings in which Fig. 1 is a plan view of a cooking device embodying our invention, parts being broken away so as to illustrate certain details of construction; Fig. 2 is a front elevation of the cooking device shown in Fig. 1, with parts broken away so as to illustrate further details of construction; Fig. 3 is a side elevation partly in section of the device shown in Figs. 1 and 2; Fig. 4 is a perspective view showing details of construction of the frame of the cooking device; Fig. 5 is a perspective detailed view of the drip tray which is normally slidably supported in the lower portion of the device; Fig. 6 is a fragmentary detailed view showing the drip tray in an open position; Fig. 7 is a fragmentary detailed view showing the drip tray in a position to remove it from the cooking device; Fig. 8 is a fragmentary elevational view in section showing one of the cooking plates and the arrangement of the electric heating element therein; and Fig. 9 illustrates the manner in which two cooking units may be banked to form an enlarged continuously extending cooking surface.

Referring to the drawings, the cooking device illustrated comprises a rectangular frame formed by a pair of parallel-side members or walls 10, a rear wall 11, and a front bracing member 12 all secured together preferably by welding. The lower portions of the side walls 10 and the rear wall 11 are provided with inwardly extended flanges 13 and 13a which act as supporting surfaces for the cooking device.

Extending between the side walls 10 are front and rear transversely extending supporting members 14 and 15 on which are supported a plurality of interchangeable cooking units or plates which are rectangular in shape and extend across the entire width of the frame. In the form shown, the cooking plates comprise two griddles 16 and 18 and a hot plate 17. All of these plates are removable and it is to be understood that their proportions are such that they may be interchanged one with the other. For example, instead of being placed in the middle position as shown, the hot plate 17 may be placed on either side. Moreover, instead of using two griddles 17, as shown, one large griddle of twice the size may be substituted therefor. Also, if desired, a frame of suitable size may be substituted for one or more of the cooking plates, the frame carrying high speed coiled cooking units of the usual type.

The cooking plates 16, 17 and 18 comprise a rectangular mass 19 (Fig. 8) of any suitable heat-conducting material such as cast iron. This mass is provided with a ground and polished cooking surface 20. Cast within the body 19 are one or more heating elements 21. The heating elements 21 may be of any suitable type, but preferably will be of the sheathed type such as described and claimed in the U. S. patent to C. C. Abbott 1,367,341, dated February 1, 1921. Briefly, these heating units comprise a resistance conductor 22 mounted in a metallic sheath 23 and supported in spaced relation with reference to the sheath by suitable powdered heat-conducting electrically insulating material (not shown). Terminal sections 24 depend from the cooking plates as shown in Fig. 3 and to these terminal sections are connected suitable electrical leads not shown.

Projecting from the under side of the plate, adjacent the corner portions are supporting feet 25 which are arranged to engage supporting surfaces of the front and rear supporting members 14 and 15. The plates also have vertical side walls 26 which are provided with notches 27, the notches acting to maintain the plates in the proper position on the front supporting member 14.

Attached to the under side of the cooking plates are reflectors 28 which are secured in place by means of screws 29. The reflectors act to reflect the heat rays back toward the cooking plate and thereby improve their cooking efficiency.

The griddles 16 and 18 and the hot plate 17 have the same general construction except that the griddles are provided with grease troughs 30 along the side and rear portions thereof for draining away grease, juices and other liquids as flow from edibles cooked on the griddle surface. The troughs 30 have a bottom surface 31 which slopes downwardly toward the front so that accumulated liquids are discharged over the front edge of the griddles.

Mounted on the front side of the frame is a switch panel 35. The switch panel may be mounted on the frame in any suitable manner and in the illustrated form is mounted by means of screws 36 to a channel-shaped cross member 37 extending between and secured to the side walls 10. The lower edge of the panel has a hooked portion 38 which hooks over a flange 39 extending downwardly from the front bracing member 12. Thus, if desired, the switch panel may be conveniently moved by removing the screws 36 and unhooking the lower portion of the flange 39. The front portions of the side walls 10 have inwardly extending right angle portions 40 forming corner sections which together with the switch panel 35 form a flush front surface for the cooking device.

Mounted on the switch panel 35 are a plurality of switches 41. Preferably, the switches 41 are of the multiposition type arranged to control the heating elements of the cooking plates 16, 17 and 18 to provide high, low and medium heat. In the form shown, two switches are provided for each cooking plate, and these switches may be connected to separate heating elements in the front and rear portions of each cooking plate so that different amounts of heat may be applied to front and rear portions of each cooking plate, as desired. The connections between the contacts of the switches, the terminals 24 of the heating elements, and the power supply are not shown as these connections are conventional and form no part of the present invention.

In accordance with one feature of the present invention, the front and rear cooking plate supporting members 14 and 15 have a novel construction whereby the supporting members and the cooking plates form substantially the entire top surface of the cooking device, the need for the usual top plate being eliminated. Furthermore, the front supporting member 14 is so shaped that it provides means for collecting grease and other residue from the cooking plates 16, 17 and 18. This construction will now be described.

As best shown in Figs. 3 and 4 of the drawings, the rear portion of the front supporting member 14 is channel-shaped so that it forms a grease trough 45 extending along substantially the entire length of the supporting member, the ends of the trough being closed by integrally-formed wall portions 46. As best shown in Fig. 8 of the drawings, the front feet 25 of the cooking plates are supported upon the upper surface of a flange 47 forming a side wall of the trough 45, the flange extending into the notches 27 in the side walls of the plates in hooked relation so that the plates are maintained in the proper assembled position. It will be observed that in the assembled position the front edges of the cooking plates extend over the edge of the flange 47 so that grease and other liquids flowing over the front edge of the griddles through the troughs 30 and residue scraped over the front edges of the plates will be deposited in the trough. This construction permits convenient removal and interchange of the positions of the cooking plates and regardless to the relative traverse position in which they are assembled, grease and other liquids draining from the griddles and residue scraped from the plates will be collected in the grease trough 45.

The front supporting member 14 has integrally formed therewith a horizontally extending portion 49 and a downwardly extending apron 50, the horizontal portion 49 providing a relatively cool flat working surface on the top side of the cooking device. The rear supporting member 15 comprises an angle bar having horizontal portions 52 and 53. The horizontal portion 52 acts as a supporting surface for the rear of feet 25 of the cooking plates while the portion 53 extends approximately in the same plane as the portion 49 of the supporting member 14 and forms a portion of the top surface of the cooking device, the two surface portions 49 and 53 being substantially in the plane of the cooking surfaces of the heating plates, as shown.

Grease and other residue collecting in the trough 45 are discharged through an aperture 54 provided in the bottom surface thereof into a removable grease receptacle 55. The grease receptacle 55 is slidably supported on a channel-shaped member 56 and may be removed from the front side of the switch panel 35 for emptying.

It will be observed that with our improved construction, the entire top surface of the cooking device is formed by the supporting members 14 and 15 and the cooking plates 16, 17 and 18. Hence, the usual top plate is entirely eliminated whereby the structure is simpler and less expensive to manufacture. Furthermore, it will be noted that this structure permits extending of the cooking plates across the entire width of the cooking device whereby the area available for cooking is greatly increased. Another advantage of this latter feature is that a number of cooking units may be banked in side-by-side relation to form an enlarged continuously extending heated cooking surface. Such an arrangement is illustrated in Fig. 9 of the drawings. Here two cooking units A and B each having a construction of the type described above, are banked in side-by-side relation so that the side walls 10a and 10b are in abutting relationship. Since the cooking plates 16a and 16b extend substantially flush with the side walls of the frame of each unit, their side walls lie adjacent each other so that the cooking surface is extended without any waste space. This arrangement has the advantage that the cooking surface area may be increased at a minimum cost simply by the addition of additional cooking units. The fact that there is little or no waste space when such a banking arrangement is used is very important in many installations where space is at a premium, such as, for example, on shipboard.

When two or more units are banked they are fastened together by means of a strip 56 which is bolted at intervals to flanges 57 and 58 extending inwardly from the top portion of the side walls 10a and 10b. Strip 56 is preferably formed of one piece of metal and extends longitudinally of the frame beneath the adjacent edges of the cooking plates 16a and 16b. In addition to performing a fastening function, the strip 56 also functions to prevent spillage passing downwardly between the cooking plates 16a and 16b from flowing down between the side walls 10a and 10b. The outer edges 59 of the strip 56 are bent downwardly so that spillage from the cooking plates is deflected into drip trays or drawers located at the bottom portions of the units A and B which will be described in detail below.

In accordance with another feature of the present invention improved means are provided for supporting a drip tray or drawer in the lower portion of the cooking device for collecting spillage passing downwardly between the cooking plates. The supporting means is constructed and arranged to support the drawer in a level position when closed and in a downwardly-tipped position, with the front edge lowered, when open, the inner surface of the drawer being exposed for convenient cleaning when supported in the downwardly tipped open position. In addition, means are provided for automatically draining the drawer when it is supported in the downwardly tipped position. This construction will now be described.

As best shown in Figs. 3 and 5 of the drawings, a drip tray or drawer 60 is supported in the lower portion of the frame beneath the cooking plates for collecting spillage therefrom. The drawer 60 is provided with side walls 61 which are slidably supported in the channel-shaped members 62 secured to the side members 10 of the frame. Each channel-shaped member or guide 62 has upper and lower inwardly extending flanges 63 and 64. As shown in Fig. 3 of the drawings, the drawer is in the closed position and in this position it is supported entirely upon the lower flanges 64 of the guides 62, the upper flanges 63 being spaced from the upper edges of the drawer. However, when the drawer is withdrawn to the open position shown in Fig. 6 of the drawings in which the center of gravity of the drawer is beyond the front edge of the lower flange 64, the front edge of the drawer tips downwardly until its movement is restrained by contact of the rear portion of the drawer with the upper flange 63, the drawer 60 being then supported in the open downwardly-tipped position. A catch 69 mounted upon the brace 12 is provided which is arranged to engage the rear wall of the drawer and prevent it from sliding outwardly beyond the position illustrated in Fig. 6. In case it is desired to remove the drawer 60 completely from the frame the catch is arranged so that the rear wall 70 of the drawer may be disengaged therefrom by lifting the front of the drawer upwardly to the position shown in Fig. 7 of the drawings. When supported in the downwardly-tipped position shown in Fig. 6 of the drawings, the inner surface of the drawer 60 is exposed so that it may be conveniently cleaned.

For the purpose of conveniently draining the contents of the drawer when it is in the downwardly-tipped position shown in Fig. 6, a channel-shaped spout 65 is provided which is in communication with the interior of the drawer through an opening 66 in the front wall thereof. The bottom surface 67 of the spout is inclined upwardly so that when the drawer is in the level position, shown in Fig. 3, liquids collected in the drawer are confined therein. However, when the drawer is opened and permitted to tip downwardly, as shown in Fig. 6, liquids collected in the drawer 60 flow outwardly through the spout 65.

The drawer 60 is provided with a handle 68 to facilitate opening. The drawer is also provided with tapered handle adaptors 68a which are adapted to wedge between the flanges 63 and 64 of the guides 62, and releasably restrain the drawer in the closed position.

In use, it sometimes happens that solid particles drop downwardly into the drawer 60 and splash grease and other liquids accumulated therein over the sides of the drawer. In order to prevent splashed liquids from running down the space between the side walls of the frame and the drawer, splasher plates 71 are provided. The splasher plates 71 are attached to the side walls 10 and slope downwardly and inwardly over the side walls of the drawer so that splashed liquids are caught by the splasher plate and returned to the drawer.

The foregoing drip tray structure is described and claimed in our copending application, Serial No. 438,358, filed April 10, 1942, which is a division of this application.

It is believed that the operation of our improved cooking device will be clear from the foregoing description. However, by way of a brief résumé, it may be stated that grease and other liquids flowing from edibles cooked upon the griddles 16 and 18 are collected in the troughs 30 and discharged over the front edges of the griddles into the trough 45. Also other residue collecting on the cooking plates 16, 17 and 18 may be conveniently scraped into the trough 45. This construction permits convenient removal and interchange of the position of the cooking plates, the trough 45 being effective to collect liquids and other residue from the plates regardless of the relative transverse position in which they are assembled. Material collecting in the trough 45 is collected in the grease receptacle 55 which is readily removable for emptying purposes.

Spillage from the cooking plates is collected in the drawer 60. When it is desired to clean the drawer, it is pulled outwardly to the position shown in Fig. 6 in which the front edge tips downwardly so that liquids collected in the drawer flow outwardly through the spout 65 into a suitable receptacle not shown, which may be placed on the floor underneath the spout. Supported in this position, the inner surface of the drawer is readily available for cleaning so that it is unnecessary for the operator to completely remove or lift the drawer in order to clean or drain it.

While the cooking device described in this application has general utility, it is particularly useful as a so-called "cooking top section" of an electric range of the type shown in Schroyer Patent 2,237,795, dated April 8, 1941 which is assigned to the same assignee as the present application. When the cooking device is used separately, supporting legs or any other suitable supporting means may be provided.

While we have shown and described particular embodiments of our invention, it will occur to those skilled in the art that various changes and modifications may be made without departing from our invention, and we, therefore, aim in the appended claims to cover all such changes and modifications as fall within the true spirit and scope of our invention.

What we claim as new and desire to secure by Letters Patent of the United States is:

A cooking device comprising a pair of units adapted to be placed in a side-by-side relation, each of said units having a rectangular frame comprising a side member which is parallel with and abuts the side member of the adjacent unit, a rectangular cooking plate supported on the frame of each unit and arranged so that a side portion thereof is substantially flush with the side member of the associated frame and parallel with and adjacent to the cooking plate supported on the frame of the adjacent unit, and a strip extending between and securing together the abutting side members, said strip being located below the cooking plates and shaped to deflect spillage passing downwardly between the cooking plates and prevent the passage of spillage into the space between said abutting side members.

JACOB L. SHROYER.
HAROLD A. MICHAELIS.